US008439386B1

(12) United States Patent
Cruz

(10) Patent No.: US 8,439,386 B1
(45) Date of Patent: May 14, 2013

(54) NAME PLATE MOTORCYCLE EXHAUST GUARD

(76) Inventor: Lucas A. Cruz, La Fontaine, IN (US)

( * ) Notice: Subject to any disclaimer, the term of this patent is extended or adjusted under 35 U.S.C. 154(b) by 0 days.

(21) Appl. No.: 13/449,114

(22) Filed: Apr. 17, 2012

(51) Int. Cl.
B62J 27/00 (2006.01)
B62J 23/00 (2006.01)

(52) U.S. Cl.
USPC ........................................ 280/304.3; 280/748

(58) Field of Classification Search ............... 280/304.3, 280/291, 748; D12/114, 126
See application file for complete search history.

(56) References Cited

U.S. PATENT DOCUMENTS

| 6,179,313 | B1 | 1/2001 | Christensen | |
|---|---|---|---|---|
| 6,626,448 | B2 | 9/2003 | Miles | |
| 6,854,542 | B2 | 2/2005 | Schoonover | |
| D517,454 | S | * 3/2006 | Chambers | D12/126 |
| 7,017,932 | B1 | 3/2006 | Miles | |
| D618,597 | S | * 6/2010 | Johnson | D12/126 |
| 2005/0081516 | A1 | * 4/2005 | Inaoka et al. | 60/324 |
| 2006/0181054 | A1 | * 8/2006 | Colano | 280/291 |
| 2008/0296878 | A1 | * 12/2008 | Pruit | 280/748 |

* cited by examiner

Primary Examiner — Tony Winner

(57) ABSTRACT

A name plate motorcycle exhaust guard that includes a name plate having a plurality of letters wrought three-dimensionally thereupon, a pair of fasteners disposed perpendicularly from an inward surface, wherein the name plate is removably attachable to a mounting bracket, said mounting bracket configured to be removably attachable to a highway peg mount of a motorcycle, whereby the name plate motorcycle exhaust guard extends rearwards in a vertical plane to shield a rider from contact with the exhaust pipe when the motorcycle is in use.

4 Claims, 3 Drawing Sheets

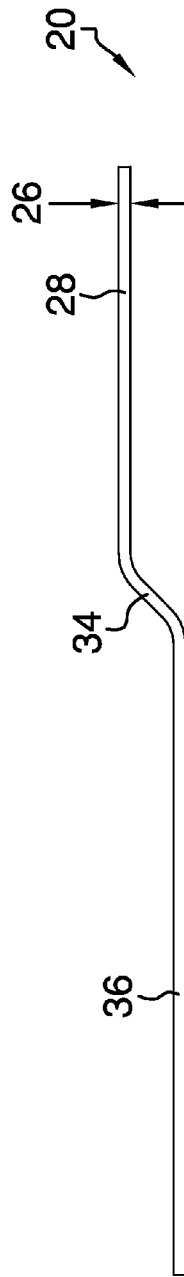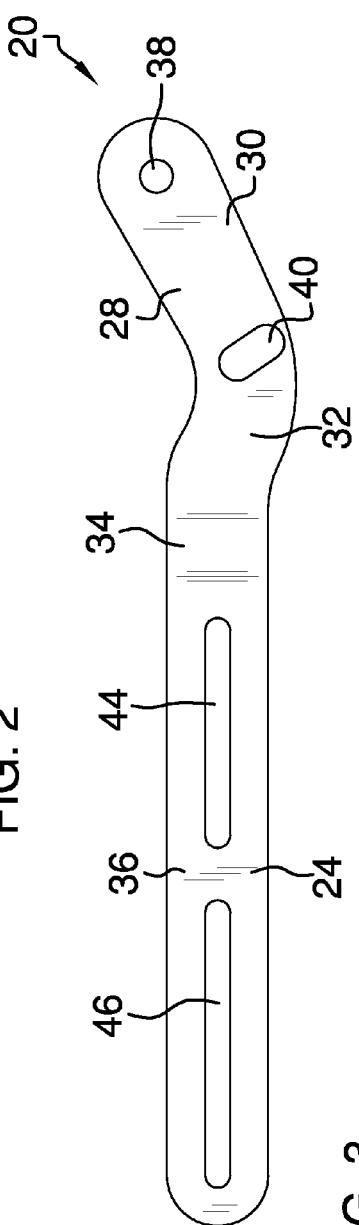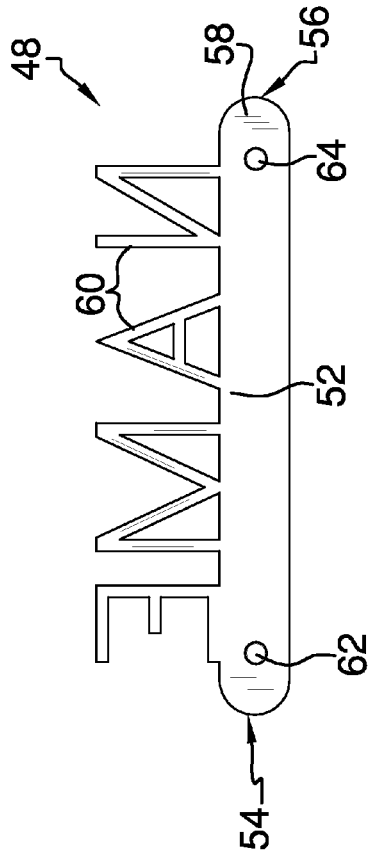

NAME PLATE MOTORCYCLE EXHAUST GUARD

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of exhaust guards and heat shields for motorcycles are known in the prior art. However, what is needed is a name plate motorcycle exhaust guard that includes a name plate having a plurality of letters wrought three-dimensionally thereupon, a pair of fasteners disposed perpendicularly from an inward surface, wherein the name plate is removably attachable to a mounting bracket, said mounting bracket configured to be removably attachable to a highway peg mount of a motorcycle, whereby the name plate motorcycle exhaust guard extends rearwards in a vertical plane to shield a rider from contact with the exhaust pipe when the motorcycle is in use.

FIELD OF THE INVENTION

The present invention relates to a name plate motorcycle exhaust guard, and more particularly, to a name plate motorcycle exhaust guard that includes a name plate having a plurality of letters wrought three-dimensionally thereupon, a pair of fasteners disposed perpendicularly from an inward surface, wherein the name plate is removably attachable to a mounting bracket, said mounting bracket configured to be removably attachable to a highway peg mount of a motorcycle, whereby the name plate motorcycle exhaust guard extends rearwards in a vertical plane to shield a rider from contact with the exhaust pipe when the motorcycle is in use.

SUMMARY OF THE INVENTION

The general purpose of the name plate motorcycle exhaust guard, described subsequently in greater detail, is to provide a name plate motorcycle exhaust guard which has many novel features that result in a name plate motorcycle exhaust guard which is not anticipated, rendered obvious, suggested, or even implied by prior art, either alone or in combination thereof.

Often when riding a motorcycle I have noted heat conducted through the exhaust pipe radiating into my lower leg. Accidentally contacting the exhaust pipe with the leg while riding a motorcycle is a common mistake, and can cause burning, damage to one's shoe, boot, trousers, and epidermis. Various exhaust heat shields are evinced in the prior art. But what is needed is a name plate motorcycle exhaust guard that includes a name or brand inscribed on a vertically oriented name plate, the name plate removably attachable to a mounting bracket disposed on an extant highway peg mount of a motorcycle.

The present invention, therefore, includes a name plate having a plurality of letters wrought three-dimensionally upon a generally parallelepiped base. A first fastener and a second fastener are perpendicularly disposed on an inward surface of the base, proximal to a respective front and back end of the base. The name plate removably attaches to a mounting bracket disposed on an extant highway peg mount of a motorcycle.

The mounting bracket includes a first portion and second portion. The first portion includes a head section, a neck section, and an angled section. The head section is angularly disposed upon the neck section and is configured to removably attach to a highway peg mount of a motorcycle. The neck section joins the head section to the angled section, the angled section conjoining the second portion to the first portion. The angled section disposes the second portion outwardly from the first portion, the second portion disposed in a plane parallel the first portion. The second portion is oriented horizontally and extends rearwards from the angled section to align parallel with an exhaust pipe of the motorcycle.

A first mounting slit and a second mounting slit are disposed upon the second portion. The first and second mounting slits are configured to releasably receive each of the first and second fasteners. Thusly, the name plate is removably attachable to the second portion and slidingly securable upon the mounting bracket to shield a person riding the motorcycle from accidental contact with the exhaust pipe of the motorcycle.

When installed on a motorcycle, the name plate is vertically oriented and extends rearwards from the mounting bracket to shield a section of the exhaust pipe most likely to contact the leg of a rider. The plurality of letters is customized to the preference of the rider or bike, as preferred, and can be any proper noun or word desirable to the rider. Furthermore, the name plate can be readily interchanged with another name plate motorcycle exhaust guard, as desired.

Thus has been broadly outlined the more important features of the present name plate motorcycle exhaust guard so that the detailed description thereof that follows may be better understood and in order that the present contribution to the art may be better appreciated.

Objects of the present name plate motorcycle exhaust guard, along with various novel features that characterize the invention are particularly pointed out in the claims forming a part of this disclosure. For better understanding of the name plate motorcycle exhaust guard, its operating advantages and specific objects attained by its uses, refer to the accompanying drawings and description.

BRIEF DESCRIPTION OF THE DRAWINGS

Figures

FIG. 2 is a top view.
FIG. 3 is a front view of a mounting bracket.
FIG. 4 is a rear view of a name plate.

DETAILED DESCRIPTION OF THE DRAWINGS

Figure 1:
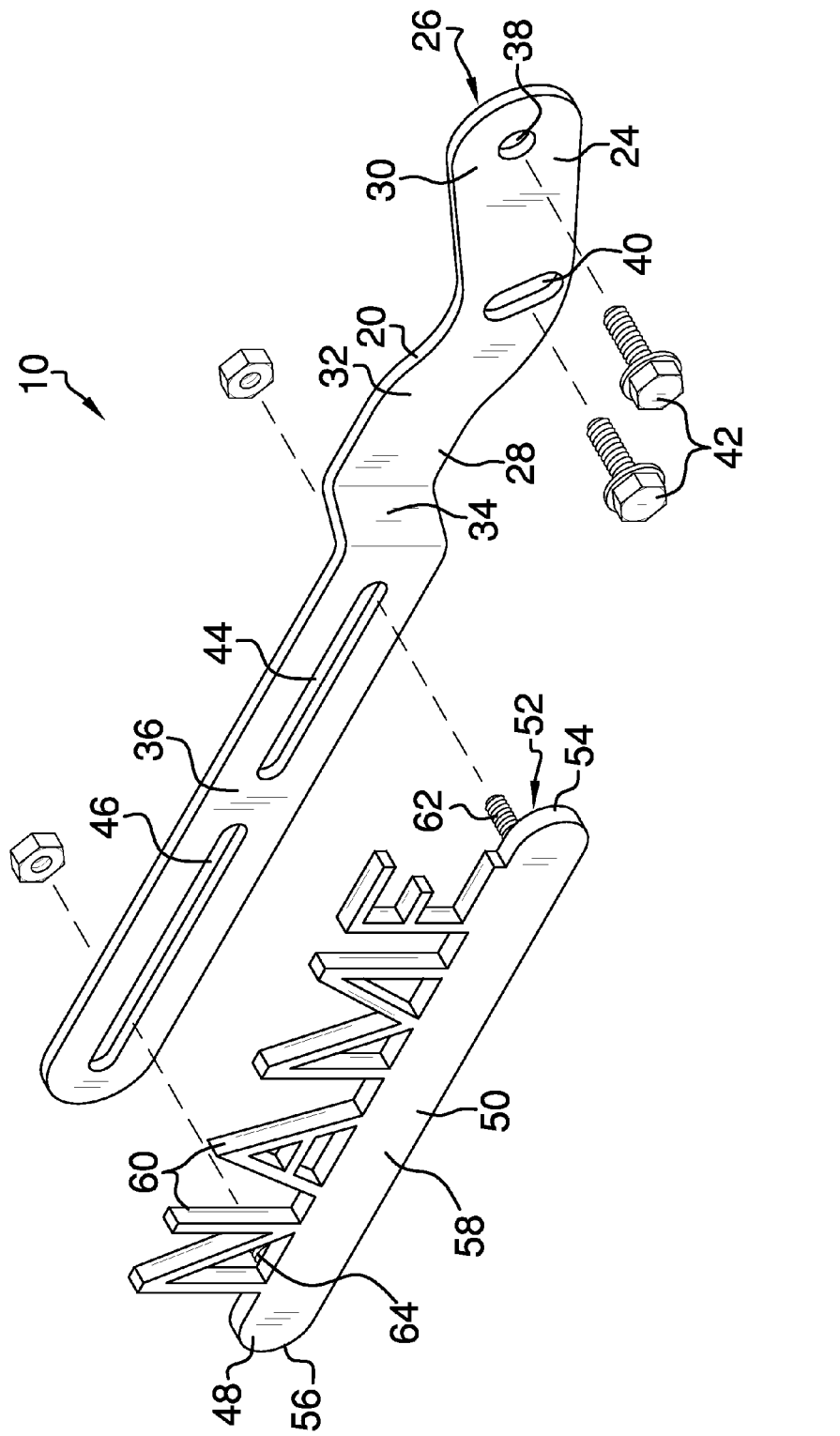
FIG. 1 is an exploded view
Figure 5:
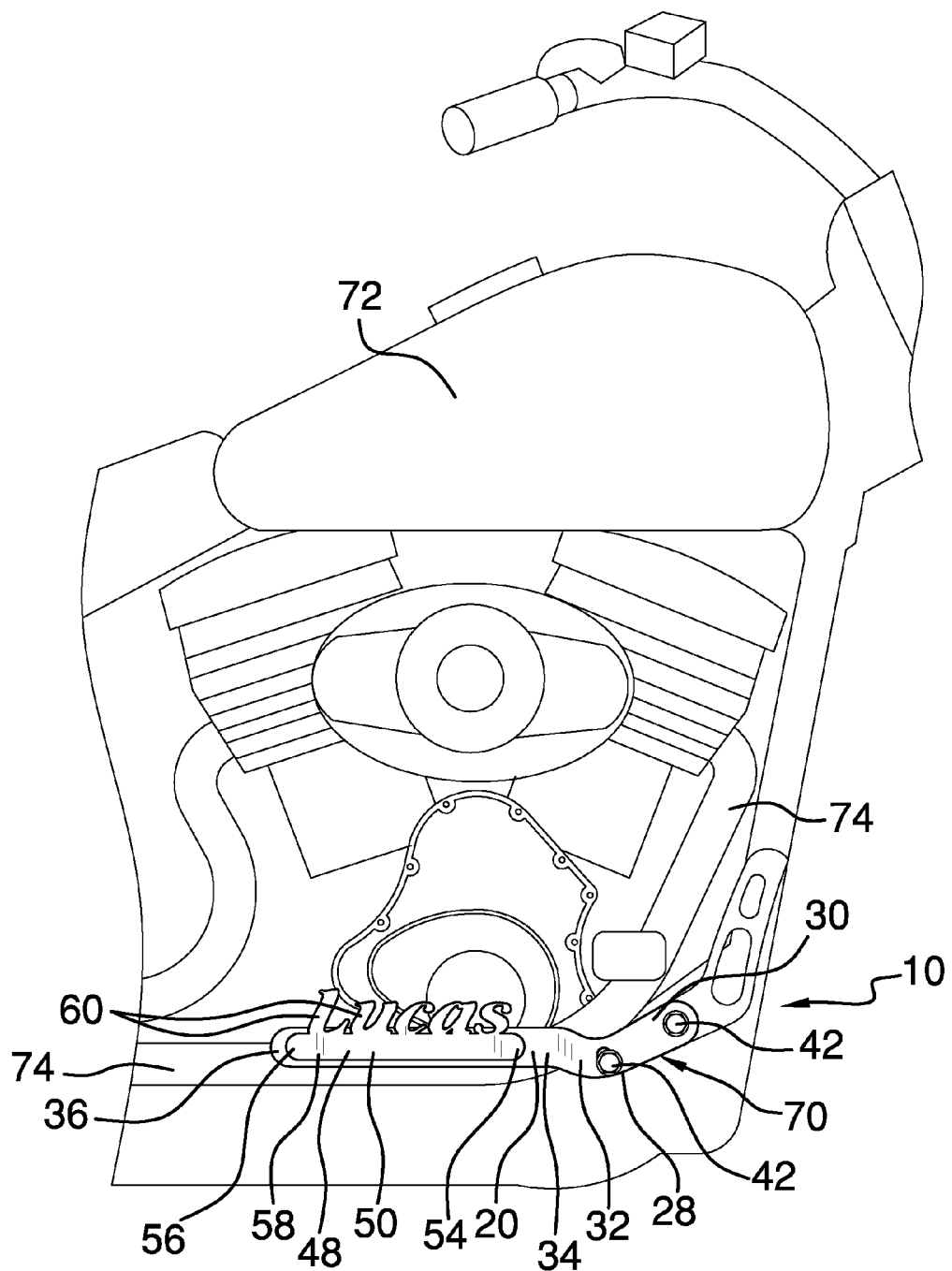
FIG. 5 is an in-use view with the device installed on an extant highway peg of an extant motorcycle.

With reference now to the drawings, and in particular FIGS. 1 through 5 thereof, example of the instant name plate motorcycle exhaust guard employing the principles and concepts of the present name plate motorcycle exhaust guard and generally designated by the reference number 10 will be described.

Referring to FIGS. 1 through 5 a preferred embodiment of the present name plate motorcycle exhaust guard 10 is illustrated.

The name plate motorcycle exhaust guard 10 includes a vertically oriented mounting bracket 20 and a vertically oriented name plate 22 releasably attachable to the mounting bracket 20. The mounting bracket 20 includes a first surface 24, a second surface 26, a first portion 28 releasably attachable to an extant highway peg mount 70 on a motorcycle 72, the first portion 28 having a head section 30 angularly disposed upon a neck section 32. The first portion 28 is thusly configured to releasably attach to a highway peg mount 70 extant on a motorcycle 72 chassis.

An angled section 34 is disposed on the neck section 32. A second portion 36 is disposed on the angled section 34, the second portion 36 disposed in a plane parallel with the first portion 28, the second portion 36 disposed laterally outward from the first portion 28 by means of the angled section 34. This second portion 36 has a longitudinal symmetry and is configured to extend rearwards to shield a section of an extant exhaust pipe 74 from contact with the leg of a person riding and operating the motorcycle 72.

A first mounting hole 38 is disposed in the head section 30 and a second mounting hole 40 is disposed in the head section 30. A pair of extant fasteners 42 releasably attach the head section 30 to the extant highway peg mount 70. When releasably fastened to the extant highway peg mount 70 the second portion 36 extends rearwards in a plane concordant with the ground.

A first mounting slit 44 is disposed in the second portion 36 and a second mounting slit 46 is disposed in the second portion 36. A name plate 48 is removably attachable to the mounting bracket 20 second portion 36. The name plate 48 includes an outward surface 50 configured to face outwardly with respect to the motorcycle 72 when mounted to the mounting bracket 20, and an inward surface 52, configured to abut the mounting bracket 20 second portion 36 when the name plate 48 is removably mounted thereto. A front end 54 is disposed proximal the mounting bracket 20 angled section 34, and a back end 56 is disposed opposite the front end 54.

The name plate 48 further includes a parallelepiped base 58 and a plurality of letters 60 disposed atop the base 58, each of the plurality of letters 60 wrought three-dimensionally atop the base 58. The plurality of letters 60 is wrought as a proper noun but may also include words or brands.

A first fastener 62 is disposed perpendicularly from the inward surface 52, the first fastener 62 disposed proximal to the front end 54. A second fastener 64 is disposed perpendicularly from the inward surface 52, the second fastener 64 disposed proximal to the back end 56. The name plate 48 releasably attaches to the second portion 36 by means of the first 62 and second 64 fasteners releasably engaging with the second portion 36. The first 62 and the second 64 fasteners releasably engage with the respective first mounting slit 44 and the second mounting slit 46 of the second portion 36 of the mounting bracket 20, and the name plate 48 is releasably attachable and slidaby securable upon the second portion 36. The name plate motorcycle exhaust guard 10 therefore extends rearwards and shields a rider from contact with a portion of an extant exhaust 74 of a motorcycle 72.

The name plate motorcycle exhaust guard 10 is customizable to a particular owner or brand of an extant motorcycle 72, as desired. The name plate 48 is made of a material resistant to the conduction of heat and is readily interchangeable with a plate 48 having a different plurality of letters 60 thereon, as desired.

What is claimed is:

1. A name plate motorcycle exhaust guard comprising in combination:
    a vertically oriented mounting bracket comprising:
        a first surface;
        a second surface;
        a first portion releasably attachable to an extant highway peg on a motorcycle, the first portion having a head section angularly disposed upon a neck section;
        an angled section disposed on the neck section;
        a second portion disposed on the angled section, the second portion disposed in a plane parallel with the first portion;
        a first mounting hole disposed in the head section;
        a second mounting hole disposed in the head section;
        a first mounting slit disposed in the second portion;
        a second mounting slit disposed in the second portion;
    a name plate releasably attachable to the mounting bracket, the name plate comprising:
        an outward surface;
        an inward surface;
        a front end;
        a back end;
        a parallelepiped base;
        a plurality of letters disposed atop the base, each of the plurality of letters wrought three-dimensionally atop the base;
        a first fastener disposed perpendicularly from the inward surface, the first fastener disposed proximal to the front end;
        a second fastener disposed perpendicularly from the inward surface disposed proximal to the back end;
    wherein the name plate releasably attaches to the second portion by means of the first and second fastener releasably engaging with the second section.

2. The name plate motorcycle exhaust guard of claim 1 wherein the first and the second fasteners releasably engage with the respective first slit and the second slit whereby the name plate is releasably attachable and slidaby securable upon the second portion.

3. The name plate motorcycle exhaust guard of claim 2 wherein the name plate extends rearwards to shield a rider from contact with a portion of an extant exhaust or a motorcycle.

4. The name plate motorcycle exhaust guard of claim 3 wherein the name plate and mounting bracket are manufactured from a material resistant to heat.

* * * * *